United States Patent [19]

Iwamoto et al.

[11] 4,327,017

[45] Apr. 27, 1982

[54] AGENT OF CHROMA AND BRIGHTNESS FOR PIGMENTS

[75] Inventors: Seigo Iwamoto, Tokyo; Eiichi Saito, Hachioji, both of Japan

[73] Assignees: Nihonshikizai Kogyo Co., Ltd.; Takeda Chemical Industries, Ltd., both of Osaka, Japan; part interest to each

[21] Appl. No.: 127,981

[22] Filed: Mar. 6, 1980

[30] Foreign Application Priority Data

Mar. 8, 1979 [JP] Japan .................................. 54-27481
Nov. 8, 1979 [JP] Japan .................. PCT/JP79/00288

[51] Int. Cl.$^3$ ............................ C09C 3/10; C09F 1/04
[52] U.S. Cl. ............................. 260/105; 106/308 F; 106/309; 260/414; 260/448 R
[58] Field of Search .......................................... 260/105

[56] References Cited

U.S. PATENT DOCUMENTS

| | | | |
|---|---|---|---|
| 2,582,833 | 1/1952 | Hunn | 260/105 |
| 2,768,996 | 10/1956 | Bulloff | 260/105 |
| 2,772,260 | 11/1956 | Yeager | 260/105 |
| 2,812,266 | 11/1957 | Golding | 260/105 |
| 2,925,430 | 2/1960 | Stedehouder et al. | 528/361 |
| 3,296,242 | 1/1967 | Turner et al. | 260/105 |
| 3,373,020 | 3/1968 | Tomanek | 260/105 |

*Primary Examiner*—H. S. Cockeram
*Attorney, Agent, or Firm*—Wenderoth, Lind & Ponack

[57] ABSTRACT

The present invention relates to the product from the reaction of a basic polyaluminum or aluminum salt with a resin acid or its salt; said resin acid being derived from a rosin or a modified rosin. This agent is especially effective for improving the chroma and brightness of pigments when such pigment is treated with the polyaluminum salt by e.g. mixing. In addition to this, the polyaluminum salt increases the lipophilic properties of the pigments, which improves their oil-dispersability and also the pigments treated with the polyaluminum salt are essentially free from bleeding.

4 Claims, No Drawings

AGENT OF CHROMA AND BRIGHTNESS FOR PIGMENTS

BACKGROUND ART

Generally, pigments have the strong cohesion force, which presents us with problems regarding the hue and dispersability in utilizing them as colorants. In order to solve the problems, most pigments are surface-treated in advance. As surface-treatment-agents for pigments, there are known, for example, salts of rosin with calcium and barium, and those of fatty acids with calcium and barium, and the like. Nevertheless, they suffer from disadvantages, such as their limited application scope in terms of pigments to be treated, poor processability and unsatisfactory chroma and brightness of resultant pigments.

DISCLOSURE OF THE INVENTION

The present invention relates to;

(1) An improving-agent of chroma and brightness for pigments, which consists of a product from the reaction of a basic polyaluminium salt or aluminium salt with a resin acid or a salt of the resin acid or with an amino-acid-based anionic surfactant, and (2) A process for producing pigments with much improved chroma and brightness, which comprises reacting a basic polyaluminium salt or an aluminium salt with a resin acid or a salt of the resin acid or with an amino-acid-based anionic surfactant in the presence of a pigment.

The basic polyaluminium salts, which are useful in the present invention, are represented by the following composition formula:

$$Al_n(OH)_m X_l$$

[wherein X is an anion of Cl, Br, I, $NO_3$, $ClO_4$, $SO_4$, etc.; l, m and n are positive integers satisfying the relationship equation, $3n = m + z \cdot l$ (wherein z is the valence of an anion represented by X)].

Referring further to the above formula, the basicity of basic polyaluminium salts is expressed by $(m/3n) \times 100$ (%), and desirably used are basic polyaluminium salts, ordinarily, with a basicity of not more than 87.5%, preferably not more than 83.3%, and especially not more than 75%. As more specific example of these, there may be mentioned compounds represented by $Al_6(OH)_{12}Cl_6$ (hereinafter referred to briefly as $Al_6$), $Al_{12}(OH)_{30}Cl_6$ (hereinafter referred to briefly as $Al_{12}$), etc. The composition formula described above merely serves as the purpose of representing the composition, while basic polyaluminium salts are actually substances of high molecular weight formed into a long chain by the linkage of a limited number, but not less than 2, of the structure represented by the above-mentioned composition formula.

The aluminium salts as hereinbefore described are represented by the following composition formula:

$$Al_2 X_{\frac{6}{z}} \cdot pH_2O$$

(wherein X and z are as defined hereinbefore; p means a positive integer).

As specific examples of such compounds there may be mentioned aluminium chloride, aluminium nitrate, aluminium sulfate, etc., although aluminium chloride, among others, is preferable. In the present invention, an aluminium salt can be utilized in lieu of basic polyaluminium salt, but the marked improvement-effect of chroma and brightness for pigments is observed with the use of the basic polyaluminium salt.

Examples of the resin acid may include naturally occurring ones as well as rosin derivatives obtained by the chemical treatment of naturally occurring resin acids. As examples of the naturally occurring resin acids there are mentioned abietic acid, neoabietic acid, levopimaric acid, dihydroabietic acid, dehydroabietic acid, dextropimaric acid, isodextropimaric acid, etc. These resin acids may be in the state of a mixture and, particularly, rosin which is a mixture containing abietic acid, etc. is the most suited for the present invention. Consequently, the resin acids described above may be used alone or in mixture. The rosin derivatives obtained by subjecting naturally occurring resin acids to chemical treatment may be any one, if it contains a free carboxyl group in the molecule and reacts with a basic polyaluminium salt or an aluminium salt; the specific examples are hydrogenated rosin produced by causing rosin to combine with hydrogen, disproportionated rosin obtained by subjecting it to dehydrogenation, and polymerized rosin formed by polymerizing two or more of rosin molecules.

Examples of the hydrogenated rosin may include Staybelite Resin of Hercules Inc. (U.S.A.), those of the disproportionated rosin Rondis R of Arakawa Chemical Industry, Ltd., and those of the polymerized rosin Dimerex Resin and Polypale Resin of Hercules Inc. (U.S.A.).

These resin acids may be used in the state of a free acid or in the state of a salt. Preferred as such salts are for example alkali metal salts and alkaline earth metal salts, and particularly suitable is sodium salt.

As specific examples of the amino-acid based anionic surfactant there may be mentioned a surfactant represented by the formulas, $RCON(CH_3)CH_2COONa$ or $RCON(CH_3)CH_2CH_2COONa$ (wherein R is a straight-chain or branched-chain alkyl group having a carbon atom number of 12 to 18), and the more specific examples include Soypon SC (sodium cocoyl sarcosine), Soypon SLP (sodium lauroyl sarcosine), Alanon ACE (sodium N-cocoyl-N-methyl-$\beta$-alanine) and Alanon AME (sodium N-myristoyl-N-methyl-$\beta$-alanine) produced by Kawaken Fine Chemicals, Ltd., and Oleoyl Zarcosine 221P and Filet L produced by Nippon Oils & Fats Co., Ltd.

In the present invention, particularly, the rosin derivatives are preferably utilized, because they are, for example, lighter-colored, higher in softening point and by far improved in heat resistance, as compared with rosin, thus being more effective in plastics. In addition, their function as an improving agent of chroma and brightness turns out to be more satisfactory as compared with that of rosin, as they can provide more marked improvement of chroma and brightness, for bronze-colored pigments such as Brilliant carmine 6B, in terms of the extinction of the bronze coloration. As is obvious from the above, the rosin derivatives are by far more improved than rosin. Among others, hydrogenated rosin and disproportionated rosin are particularly preferred. The weight ratio of the resin acid or its salt or amino-acid based anionic surfactant to the basic polyaluminium salt or aluminium salt, as hereinbefore described, may be nearly stoichiometric.

The preparation of the improving agent according to the present invention is carried out, for example, by dissolving a resin acid or its salt or an amino-acid-based anionic surfactant in an appropriate solvent and adding gradually a basic polyaluminium salt or aluminium salt, directly or after being dissolved in an appropriate solvent, to allow the desired product to precipitate. Contrary to the above, of course, the preparation may be carried out by adding to a solution of a basic polyaluminium salt or aluminium salt, a resin acid or its salt or an amino-acid-based anionic surfactant, directly or in the form of a solution. Alternatively, a basic polyaluminium salt or aluminium salt and a resin acid or its salt or an amino-acid-based anionic surfactant, respectively in the form of a solution, may be simultaneously mixed, or may be directly mixed, followed by adding an appropriate solvent to allow the reaction to proceed in the solution. The reaction is desirably carried out in the presence of an appropriate deacidifying agent. As specific examples of such deacidifying agent, there can be mentioned alkali metal hydroxides such as sodium hydroxide and potassium hydroxide, alkali metal carbonates, such as sodium carbonate and potassium carbonate, alkali metal bicarbonates, such as sodium hydrogencarbonate, and other bases. The used quantity of a deacidifying agent may be equivalent to acid by-produced in the reaction.

Examples of the solvent which is suitable for the above-mentioned reaction may specifically include water, ethanol, methanol, etc. and mixtures thereof. The reaction is ordinarily carried out at a temperature ranging from ambient temperature to 100° C., and the reaction normally is completed within about 1 hour.

The reaction is supposed to proceed through the following equations:
(1) In the case of a basic polyaluminium salt;

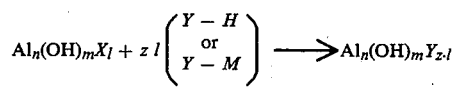

(2) In the case of an aluminium salt;

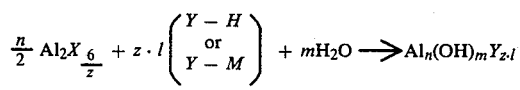

[wherein X, l, m, n and z are as defined hereinbefore; the formula, Y—H, represents a resin acid; in the formula of Y—M, Y means a radical formed by eliminating the portion of a base from a salt of a resin acid or an amino-acid-based anionic surfactant, and M means the portion of a base of the salt of a resin acid or the amino-acid based anionic surfactant].

The improving agent for pigments according to the present invention may be the thus produced aluminium salts of acids themselves or further incorporated with suitable other components such as excipients (e.g., precipitated barium carbonate, calcium carbonate, kaolin, alumina, mica, etc.), other improving agents for pigments (e.g., calcium salt of rosin, barium salt of rosin, calcium or barium salt of such fatty acids as stearic acid, and the like) and others. Treatment of pigments with the improving agent according to the present invention improves greatly the chroma and brightness of their hues and, at the same time, increases their lipophilic properties, thus resulting in the improvement of their dispersabilities in organic solvents, vehicles, plastics and other organic substances.

There is no particular limitation to the pigments to be treated, and the improving agent of chroma and brightness according to the present invention is effective, for example, specifically for soluble azo pigments, insoluble azo pigments, polycyclic pigments, carbon black, inorganic pigments, extenders, white pigments and any other pigments. A more specific enumeration of these pigments is as follows: as examples of the soluble azo pigments are mentioned Lake red C, Brilliant carmine 6B, Permanent red F5R, Bordeaux 10B, Lake red R, Lake red D, Orange lake, Brilliant carmine 3B, Lithol red, Lithol rubine GK, Brilliant scarlet G, Helio Bordeaux BL, etc.; examples of the insoluble azo pigments include Benzidine yellow, Benzidine orange, Naphthol red homologs, Pyrazolone orange, Pyrazolone red, Permanent yellow FGL, Permanent orange HL, etc.; examples of the polycyclic pigments are Phthalocyanine blue, Phthalocyanine green, Fast sky blue, Quinacridone red, Quinacridone magenta, Dioxazine violet, Isoindolinone yellow-greenish, Isoindolinone yellow-reddish, Perynone orange, Perylene-based pigments, Thioindigo-based pigments, Helindone, Anthraquinone-based pigments, etc.; as examples of the inorganic pigments there are mentioned iron oxide red, chromium hydroxide, minium, ultramarine blue, Prussian blue, cobalt hydroxide, chrome yellow, chromium oxide, iron oxide yellow, iron oxide black, etc.; examples of the extenders include scale leaf, bismuth oxychloride, titanium mica leaf and the like, pearl pigment, baryte powder, precipitated barium sulfate, barium carbonate, calcium carbonate powder, precipitated calcium carbonate, gypsum, asbestos, clay, mica, silica powder, finely ground silicic acid, diatomaceous earth, talc, basic magnesium carbonate, alumina white, gloss white, satine white, etc.; and, as examples of the white pigments there are mentioned zinc white, lead white, basic lead sulfate, lead sulfate, lithopone, zinc sulfide, antimony oxide, etc.

The improvement-treatment of chroma and brightness in the present invention is carried out by contacting the pigment with the improving agent according to the present invention. So as to insure contact between both of them, they may be merely mixed, whereby mixing may be effected by any methods. For example, the pigment and improving agent may be mixed directly or together with a suitable solvent such as water and ethanol. Alternatively, the improving agent may be mixed with oils and fats, and the like to a paste form to be kneaded with a pigment. As regards its application into plastics, the pigment treated by the method according to the present invention is directly kneaded into plastics. Kneading may be carried out normally at room temperature or under stirring. Kneading, under stirring, is completed normally within about 1 hour.

Another version of the improvement-treatment of the chroma and brightness according to the present invention lies in the method in which reaction between the basic polyaluminium salt or aluminium salt and the resin acid or its salt or amino-acid-based anionic surfactant, as hereinbefore described, is effected under the presence of a pigment. That is to say, a pigment is allowed to be present in the reaction system. In the case of this method being adopted, adsorption of the improving agent upon the surfaces of a pigment is highly firm and tight, and there can be obtained a pigment with a very high degree of improvement of the chroma and brightness and far improved oil-dispersability properties. The order for adding (1) the pigment, (2) the resin acid or its salt or the amino-acid based anionic surfactant and (3) the basic polyaluminium salt or aluminium salt may be optional.

In any of the above improvement-treatments, the proportion is used quantities (hereinafter referred to as improvement rate) of the improving agent of chroma and brightness (as the quantity converted to the salt of acid with aluminium or the effective ingredient) varies depending upon the type of pigments, the application purpose of pigments and type of improving agents for enhancing chroma and brightness, and this can not be precisely described. Meanwhile, it is suggested that the improving agent of the present invention, as converted to aluminium salt of the acid or the effective ingredient, is used normally in the proportion of about 5 to 100% (by weight) of the pigment.

For example, the recommended improvement rate is desirably 5 to 30% for soluble azo pigments, 5 to 80% for carbon black, 10 to 40 % for polycyclic pigments, such as cyanine blue, and 5 to 20% for inorganic pigments, such as iron oxide red. The methods according to the present invention provide pigments having a very high degree of improved chroma and brightness in which the bronze markedly disappears and is free from bleeding. Also the agent of the present invention possesses superior durability and exceedingly superior oil-dispersability as a result of the firm adsorption of the improving agent upon the surface of pigment.

The pigment obtained according to the present invention is improved in respect to the brightness and chroma of the pigment hue. The improvement of the chroma and brightness of the pigments of the present invention, in terms of the standard defined in for example, the Munsell Color System, resides in reducing the Munsell value of the pigment hue and increasing the Munsell chroma of the pigment hue.

Best Mode for Carrying out the Invention

In the examples to be described below, $Al_6$ designates the basic polyaluminium salt having the composition of $Al_6(OH)_{12}Cl_6$ and an Al content of 5.2 mol/l, and $Al_{12}$ the basic aluminium salt having the composition of $Al_{12}(OH)_{30}Cl_6$ and an Al content of 1.2 mol/l.

For the self-recording spectrophotometer, a Hitachi Color Analyzer 307 is employed. The equation of Friede-MacAdam-Chickering (II) is referred to briefly as the "equation of F.M.C. (II).

EXAMPLE 1

| Staybelite Resin | 10 g |
| Sodium hydroxide | 1.32 g. |
| $Al_6$ | 6.34 ml |

Into 800 ml of hot water are dissolved 10 g of Staybelite Resin and 1.32 g of sodium hydroxide at 80° C., and 6.34 g of $Al_6$ is added gradually to the solution, followed by stirring for 1 hour. The precipitate is recovered by filtration, washed with water and dried, resulting in a polyaluminium salt of Staybelite Resin.

EXAMPLE 2

| Rondis R | 111.8 g |
| Sodium hydroxide | 15.1 g |
| $Al_6$ | 73 ml |

Into 2.5 l of hot water are dissolved 111.8 g of Rondis R and 15.1 g of sodium hydroxide at 80° C., and 73 ml of $Al_6$ is added gradually to the solution, followed by stirring for 1 hour. The precipitate is recovered by filtration, washed with water and dried, resulting in a polyaluminium salt of Rondis R.

EXAMPLE 3

| Rosin | 10 g |
| Sodium hydroxide | 1.32 g |
| $Al_6$ | 6.38 ml |

Dissolved at 90° C. into 500 ml of hot water are 10 g of Rosin and 1.32 g of sodium hydroxide, and 6.38 ml of $Al_6$ is added gradually to the solution, followed by stirring for 1 hour. The precipitate is recovered by filtration, washed with water and dried, resulting in a polyaluminium salt of rosin.

EXAMPLE 4

| Dimerex Resin | 100 g |
| Sodium hydroxide | 13.0 g |
| $Al_6$ | 57 ml |

Dissolved at 80° C. into 2.5 l of hot water are 100 g of Dimerex Resin and 13.0 g of sodium hydroxide, and 57 ml of $Al_6$ is added gradually to the solution, followed by stirring for 1 hour. The precipitate is recovered by filtration, washed with water and dried, resulting in a polyaluminium salt of Dimerex Resin.

EXAMPLE 5

| Polypale Resin | 100 g |
| Sodium hydroxide | 13.0 g |
| $Al_6$ | 57 ml |

Dissolved at 80° C. into 2.5 l of hot water are 100 g of Polypale Resin and 13.0 g of sodium hydroxide, and 57 ml of $Al_6$ is added gradually to the solution, followed by stirring for 1 hour. The precipitate is recovered by filtration, washed with water and dried, resulting in a polyaluminium salt of Polypale Resin.

EXAMPLE 6

| Abietic acid | 10 g |
| Sodium hydroxide | 1.32 g |
| $Al_6$ | 6.38 ml |

Dissolved at 90° C. into 500 ml of hot water are 10 g of abietic acid and 1.32 g of sodium hydroxide, and 6.38 ml of $Al_6$ is added gradually to the solution, followed by stirring for 1 hour. The precipitate is recovered by filtration, washed with water and dried, resulting in a polyaluminium salt of abietic acid.

EXAMPLE 7

| Rosin | 40 g |

| | |
|---|---|
| Sodium hydroxide | 5.28 g |
| Al$_{12}$ | 216 ml |

Dissolved at 70° C. into 1.5 l of hot water are 40 g of rosin and 5.28 g of sodium hydroxide, and 216 ml of Al$_{12}$ is added gradually to the solution, followed by stirring for 1 hour. The precipitate is recovered by filtration, washed with water and dried, resulting in a polyaluminium salt of rosin.

EXAMPLE 8

| | |
|---|---|
| Staybelite Resin | 20 g |
| Sodium hydroxide | 2.64 g |
| Al$_{12}$ | 108 ml |

Dissolved at 80° C. into 1.8 l of hot water are 20 g of Staybelite Resin and 2.64 g of sodium hydroxide, and 108 ml of Al$_{12}$ is added gradually to the solution, followed by stirring for 1 hour. The precipitate is recovered by filtration, washed with water and dried, resulting in a polyaluminium salt of Staybelite resin.

EXAMPLE 9

| | |
|---|---|
| Rondis R | 80 g |
| Sodium hydroxide | 10.8 g |
| Al$_{12}$ | 443 ml |

Dissolved at 80° C. into 4.0 l of hot water are 80 g of Rondis R and 10.8 g of sodium hydroxide, and 443 ml of Al$_{12}$ is added gradually to the solution, followed by stirring for 1 hour. The precipitate is recovered by filtration, washed with water and dried, resulting in a polyaluminium salt of Rondis R.

EXAMPLE 10

| | |
|---|---|
| Polypale Resin | 40 g |
| Sodium hydroxide | 5.2 g |
| Al$_{12}$ | 195 ml |

Dissolved at 80° C. into 2.0 l of hot water are 40 g of Polypale Resin and 5.2 g of sodium hydroxide, and 195 ml of Al$_{12}$ is added gradually to the solution, followed by stirring for 1 hour. The precipitate is recovered by filtration, washed with water and dried, resulting in a polyaluminium salt of Polypale Resin.

EXAMPLE 11

| | |
|---|---|
| Alanon AME | 20 g |
| Al$_6$ | 11.8 ml |

Into 600 ml of water is dissolved 20 g of Alanon AME, and 11.8 ml of Al$_6$ is added gradually to the solution, followed by stirring for 1 hour. The precipitate is recovered by filtration, washed with water and dried, resulting in a polyaluminium salt of Alanon AME.

EXAMPLE 12

| | |
|---|---|
| Staybelite Resin | 20.8 g |
| Sodium hydroxide | 7.74 g |
| AlCl$_3$ . 6H$_2$O | 14.5 g |

20.8 g Of Staybelite Resin and 2.58 g of sodium hydroxide are dissolved in water to make the total volume to 300 ml, and 5.16 g of sodium hydroxide is dissolved into water to make a total volume of 300 ml, while 14.5 g of aluminium chloride is dissolved into water to make a total volume of 300 ml. These solutions are placed in separate dropping funnels, repsectively, and are added dropwise, at the nearly same rates, under stirring, to a vessel containing 100 ml of water. After completion of addition, stirring is continued for 30 minutes. The precipitate is recovered by filtration, washed with water and dried, resulting in a polyaluminium salt of Staybelite Resin.

EXAMPLE 13

| | |
|---|---|
| Staybelite Resin | 20.8 g |
| Sodium hydroxide | 7.74 g |
| Al$_2$(SO$_4$)$_3$ . 16H$_2$O | 18.9 g |

There is obtained a polyaluminium salt of Staybelite Resin in the same manner as described in Example 12, except for 18.9 g of aluminium sulfate to be employed in place of 14.5 g of aluminium chloride used in Example 12.

Experimental Example 1

10 g Of commercially available carbon black are well admixed with 6 g each of the improving agents obtained by the procedures of Examples 1, 2, 3, 4, 5, 6, 11 and 12 respectively. Comparisons between test specimens coated with each of the treated carbon blacks and a specimen coated with the starting carbon black (the latter is to be the original color) indicate that the carbon blacks incorporated with the improving agents are highly improved in chroma and brightness exceedingly superior in oildispersability, and are outstandingly enhanced in blackness, and free from bleeding as opposed to the specimen not so treated. Reflectance measurements, as taken at each of the indicated wavelengths with the 8 coated specimens by means of the self-recording spectrophotometer, confirm the distinct differences existing between the original color and the carbon blacks incorporated with the improving agents. In other words, by calculating the tristimulus values, X, Y and Z measured by means of the self-recording spectrophotometer, in accordance with the equation of F.M.C.(II), the differences between the original color and the carbon blacks incorporated with the improving agents are determined in terms of the color differences, $\Delta E$; the results are shown in Table 1.

TABLE 1

| | Example 1 | Example 2 | Example 3 | Example 4 | Example 5 | Example 6 | Example 11 | Example 12 |
|---|---|---|---|---|---|---|---|---|
| $\Delta E$ | 6.521 | 5.187 | 3.487 | 6.293 | 6.263 | 1.182 | 4.652 | 4.733 | wherein $\Delta E = 1$ is the lowest limit that can be discriminated by human eyes.

Experimental Example 2

20 g Of cyanine blue are well admixed with 5 g each of the improving agents obtained by the procedures of 1, 2, 3, 4 and 5, respectively. Comparisons between test specimens coated with each of the treated cyanine blue and the specimen coated with the starting cyanine blue (the latter is referred to as "original color") indicate that the cyanine blues incorporated with the improving agents are exceedingly superior in oil-dispersability, freed completely of bronze coloring, are highly improved in chroma and brightness and free from bleeding.

Reflectance measurements, as taken at each of the indicated wavelengths with the 6 coated test specimens by means of the self-recording spectrophotometer, confirm the distinct differences existing between the original color and the cyanine blues incorporated with the improving agents. In other words, by calculating the tristimulus values X, Y and Z, as measured by the self-recording spectrophotometer, in accordance with the equation of F.M.C.(II), the differences between the original color and the cyanine blues incorporated with the improving agents are determined in terms of the color differences, $\Delta E$; the results are shown in Table 2.

TABLE 2

|  | Example 1 | Example 2 | Example 3 | Example 4 | Example 5 |
|---|---|---|---|---|---|
| $\Delta E$ | 5.039 | 7.924 | 1.465 | 3.810 | 5.018 |

Experimental Example 3

20 g Of iron oxide red are well admixed with 4 g each of the improving agents obtained by the procedures of Examples 1, 2, 3, 4 and 5, respectively. Comparisons between test specimens coated with each of the treated iron oxide red and the specimen coated with the starting iron oxide reds (the latter is referred to as "original color") indicate that the iron oxide reds incorporated with the improving agents are exceedingly superior in the oil dispersability, highly improved in the chroma and brightness, glossy, and free from bleeding.

Reflectance measurements, as taken at each of the indicated wavelengths with the 6 coated test specimens by means of the self-recording spectrophotometer, confirm the distinct differences existing between the original color and the iron oxide reds incorporated with the improving agents. In other words, by calculating the tristimulus values, X, Y, and Z, as measured by the self-recording spectrophotometer, in accordance with the equation of F.M.C.(II), the differences between the original color and the iron oxide reds incorporated with the improving agents are determined in terms of the color differences, $\Delta E$; the results are shown in Table 3.

TABLE 3

|  | Example 1 | Example 2 | Example 3 | Example 4 | Example 5 |
|---|---|---|---|---|---|
| $\Delta E$ | 14.208 | 13.451 | 15.068 | 15.712 | 13.216 |

Experimental Example 4

20 g Of Brilliant Carmine 6B are well admixed with 4 g each of the improving agents obtained by Examples 1, 2, 3, 4, 5, 9, 12 and 13, respectively. Comparisons between test specimens coated with each of the treated pigments and the specimen coated with the starting Brilliant Carmine 6B (this is referred to as "original color") indicate that the Brilliant Carmine 6Bs incorporated with the improving agents are exceedingly superior in oil-dispersability, freed completely of bronze coloration, are highly improved in chroma and brightness, and are free from bleeding.

Reflectance measurements, as taken at each of the indicated wavelengths with the 9 coated test specimens by means of the self-recording spectrophotometer, confirm the distinct differences between the original color and the pigments incorporated with the improving agents. In other words, by calculating the tristimulus values, X, Y and Z, as measured by the self-recording spectrophotometer, in accordance with the equation of F.M.C.(II), the differences between the original color and the pigments incorporated with the improving agents are determined in terms of the color differences, $\Delta E$; the results are shown in Table 4.

TABLE 4

|  | Example 1 | Example 2 | Example 3 | Example 4 | Example 5 | Example 9 | Example 12 | Example 13 |
|---|---|---|---|---|---|---|---|---|
| $\Delta E$ | 13.532 | 12.386 | 9.368 | 10.029 | 10.688 | 7.995 | 10.164 | 9.872 |

Experimental Example 5

20 g Of Permanent Red F5R are well admixed with 5 g each of the improving agents obtained by the procedures of Examples 7, 8, 9 and 10, respectively. Comparisons between test specimens coated with each of the treated pigments and the specimen coated with the starting Permanent Red F5R (this is referred to as "original color") indicate that the Permanent Red F5R pigments being incorporated with the improving agents are exceedingly superior in oil-dispersability, highly improved in the chroma and brightness, freed completely of bronze coloration, and free from bleeding.

Reflectance measurements, as taken at each of the indicated wavelengths with the 5 coated test specimens by means of the self-recording spectrophotometer, confirm the distinct differences existing between the original color and the pigments incorporated with the improving agents. In other words, by calculating the tristimulus values, X, Y and Z, as measured by the self-recording spectrophotometer, in accordance with the equation of F.M.C.(II), the differences between the original color and the pigments incorporated with the improving agents are determined in terms of the color differences, $\Delta E$; the results are shown in Table 5.

TABLE 5

|  | Example 7 | Example 8 | Example 9 | Example 10 |
|---|---|---|---|---|
| $\Delta E$ | 2.681 | 14.658 | 14.887 | 12.210 |

| Example 14 | |
|---|---|
| Disodium 2-sulfo-4-methyl-1-azo-1,2-oxy-3-naphthoate | 22.8 g |
| Calcium chloride . dihydrate | 7.9 g |
| Rosin | 5.35 g |
| Sodium hydroxide | 0.56 g |
| $Al_{12}$ | 29 ml |

Into 1000 ml of water is dispersed 22.8 g of disodium 2-sulfo-4-methyl-1-azo-1,2-oxy-3-naphthoate. A solution of 7.9 g of calcium chloride in 100 ml of water is poured to the dispersed solution of the dye under stirring and at 20° C. After stirring is continued for 1 hour, 5.35 g of rosin and 0.56 g of sodium hydroxide are dissolved in 100 ml of hot water at the temperature of 90° C., and cooled down to 20° C. to be added to the mixture, followed by adding further 29 ml of an aqueous solution of $Al_{12}$ and effecting stirring for 1 hour. Following heating to 60° C. and stirring for 1 hour, the mixture is left cool. The precipitate is recovered by filtration, washed with water and dried, resulting in a dark-red colored, powdered pigment with exceedingly superior oil-dispersability, completely free of bronze coloration, highly enhanced chroma and brightness as well as freedom from bleeding.

EXAMPLE 15

| Carbon black | 20 g |
|---|---|
| Rosin | 10 g |
| Sodium hydroxide | 1.33 g |
| $Al_6$ | 6.39 ml |

Into 500 ml of water is dispersed 20 g of carbon black. Separately, 10 g of rosin and 1.33 g of sodium hydroxide are dissolved at 90° C. into 100 ml of hot water, and the solution is cooled to 20° C. to be added to the dispersion of carbon black. 6.39 ml Of $Al_6$ is added gradually to the mixture under stirring, and stirring is continued for 30 minutes. The precipitate is recovered by filtration, washed with water and dried, resulting in carbon black with exceedingly superior oil dispersability, highly improved chroma and brightness, markedly increased blackness and freedom from bleeding.

EXAMPLE 16

| Carbon black | 20 g |
|---|---|
| Rosin | 11.7 g |
| Sodium hydroxide | 1.6 g |
| $AlCl_3 \cdot 6H_2O$ | 3.1 g |

Into 500 ml of water is dispersed 20 g of carbon black. 11.7 g Of rosin and 1.6 g of sodium hydroxide are separately dissolved at 90° C. in 100 ml of hot water, and the solution is cooled to 20° C. to be added to the dispersion of carbon black. An aqueous solution of 3.1 g of aluminium chloride in 100 ml of water is added gradually to the mixture under stirring. After continuous stirring for 30 minutes, the precipitate is recovered by filtration, washed with water and dried, resulting in carbon black with exceedingly superior oil dispersability, highly increased blackness and freedom from bleeding.

EXAMPLE 17

| Carbon black | 20 g |
|---|---|
| Staybelite Resin | 10 g |
| Sodium hydroxide | 1.32 g |
| $Al_6$ | 6.34 ml |

Into 500 ml of water is dispersed 20 g of carbon black. 10 g Of Staybelite Resin and 1.32 g of sodium hydroxide are separately dissolved at 80° C. in 100 ml of hot water to be added to the dispersion of carbon black. 6.34 ml Of $Al_6$ is added gradually to the mixture under stirring. After stirring is continued for 30 minutes, the precipitate is recovered by filtration, washed with water and dried, thus resulting in the carbon black with exceedingly superior oil dispersability, highly improved chroma, markedly increased blackness and freedom from bleeding.

Experimental Example 6

With the prepared test specimens coated with the carbon blacks obtained in Examples 15, 16 and 17 and the commercially available carbon black (the latter is referred to as "original color"), the reflectance measurements taken at each of the indicated wavelengths by means of the self-recording spectrophotometer confirm the distinct differences between the original color and improvement-treated carbon blacks. In other words, by calculating the tristimulus values, X, Y and Z, as measured by the self-recording spectrophotometer, in accordance with the equation of F.M.C.(II), the differences between the original color and improvement treated carbon blacks are determined in terms of the color differences, $\Delta E$; the results are shown in Table 6.

TABLE 6

| | Example 15 | Example 16 | Example 17 |
|---|---|---|---|
| $\Delta E$ | 6.657 | 2.141 | 6.835 |

With the carbon blacks obtained in Examples 15 and 16 as well as starting carbon black of the original color, a comparative test for the blackness is run by diluting with titanium dioxide.

Thus, 100 parts by weight of commercially available carbon black is diluted with 100 parts by weight of titanium dioxide to form the original color; when the original color is compared with the carbon blacks obtained in Examples 15 and 16, respectively, it has been shown that, so as to produce the brightness equal to the original color, the carbon black as per Example 15 requires 600 parts by weight of titanium dioxide against 100 parts by weight, while that of Example 16 demanding 200 parts by weight of titanium dioxide against 100 parts by weight.

EXAMPLE 18

| Carbon black | 20 g |
|---|---|
| Alanon ACE | 12 g |
| $Al_6$ | 8.2 ml |

Into 500 ml of water is dispersed 20 g of carbon black, and Alanon ACE is added to the dispersion. 8.2 ml of $Al_6$ is added gradually to the reaction mixture under stirring. After stirring is continued for 30 minutes, the precipitate is recovered by filtration, washed with water and dried, thus resulting in carbon black with exceedingly superior oil dispersability, highly improved chroma, markedly increased blackness and freedom from bleeding.

EXAMPLE 19

| Carbon black | 20 g |
|---|---|
| Rosin | 6.0 g |
| Sodium hydroxide | 0.63 g |
| Alanon AME | 6.0 g |

| | |
|---|---|
| Al₆ | 6.54 ml |

Into 500 ml of water is dispersed 20 g of carbon black. Separately, 6.0 g of rosin and 0.63 g of sodium hydroxide are dissolved at 100° C. in 100 ml of hot water and cooled down to 20° C., followed by admixing with a solution of 6.0 g of Alanon AME in 100 ml of water to be added to the dispersion of carbon black. 6.54 ml of Al₆ is added gradually to the mixture under stirring. After stirring is continued for 30 minutes, the precipitate is recovered by filtration, washed with water and dried, thus resulting in the carbon black with the exceedingly superior oil dispersability, highly improved chroma, markedly increased blackness and freedom from bleeding.

EXAMPLE 20

| | |
|---|---|
| Cyanine blue | 20 g |
| Rosin | 4.17 g |
| Sodium hydroxide | 0.55 g |
| Al₆ | 2.66 ml |

Into 500 ml of water is dispersed 20 g of cyanine blue. 4.17 g Of rosin and 0.55 g of sodium hydroxide are separately dissolved at 90° C. in 100 ml of hot water and cooled down to 20° C. to be added to the dispersion of cyanine blue. 2.66 ml Of Al₆ is added gradually to the mixture under stirring, and stirring is continued for 30 minutes. The precipitate is recovered by filtration, washed with water and dried, thus resulting in a cyanine blue with exceedingly superior oil dispersability, complete disappearance of bronze coloring, highly improved chroma and brightness as well as freedom from bleeding.

EXAMPLE 21

| | |
|---|---|
| Cyanine blue | 20 g |
| Polypale Resin | 4.17 g |
| Sodium hydroxide | 0.55 g |
| Al₆ | 2.66 ml |

Into 500 ml of water is dispersed 20 g of cyanine blue. 4.17 g Of Polypale Resin and 0.55 g of sodium hydroxide are separately dissolved at 80° C. in 100 ml of hot water to be added to the dispersion of cyanine blue. 2.66 ml Of Al₆ is added gradually to the mixture under stirring, and stirring is continued for 30 minutes. The precipitate is recovered by filtration, washed with water and dried, thus resulting in cyanine blue with exceedingly superior oil dispersability, complete disappearance of bronze coloration, highly improved chroma and brightness, as well as freedom from bleeding.

Experimental Example 7

Coated test specimens are prepared with the cyanine blues obtained in Examples 20 and 21 as well as commercially available cyanine blue (referred to as "original color") to measure the reflectances at each of the indicated wavelengths by means of the self-recording spectrophotometer. The results confirm the distinct differences between the original color and the improvement-treated cyanine blues. In other words, by calculating the tristimulus values, X, Y and Z, as measured by the self-recording spectrophotometer, in accordance with the equation of F.M.C. (II), the differences between the original color and the improvement treated cyanine blues are determined in terms of the color differences, $\Delta E$; the results are shown in Table 7.

TABLE 7

| | Example 20 | Example 21 |
|---|---|---|
| $\Delta E$ | 6.874 | 12.138 |

EXAMPLE 22

| | |
|---|---|
| Iron oxide red | 40 g |
| Rondis R | 6.67 g |
| Sodium hydroxide | 0.9 g |
| Al₆ | 4.82 ml |

Into 1000 ml of water is dispersed 40 g of iron oxide red at 80° C. 6.67 g Of Rondis R and 0.9 g of sodium hydroxide are separately dissolved at 70° C. in 100 ml of hot water to be added to the dispersion of iron oxide red. 4.82 ml Of Al₆ is added gradually to the mixture under stirring, and stirring is continued for 30 minutes. The precipitate is recovered by filtration, washed with water and dried, thus resulting in the iron oxide red with the exceedingly superior oil dispersability, highly improved chroma and brightness, gloss and freedom from bleeding.

EXAMPLE 23

| | |
|---|---|
| Iron oxide red | 40 g |
| Rondis R | 7.79 g |
| Sodium hydroxide | 1.05 g |
| AlCl₃ . 6H₂O | 2.11 g |

Into 1000 ml of water is dispersed 40 g of iron oxide red. 7.79 g Of Rondis R and 1.05 g of sodium hydroxide are separately dissolved at 70° C. in 100 ml of hot water to be added to the dispersion of iron oxide red. A solution of 2.11 g of aluminium chloride in 50 ml of water is added gradually to the mixture under stirring, and stirring is continued for 30 minutes. The precipitate is recovered by filtration, washed with water and dried, thus resulting in iron oxide red with exceedingly superior oil dispersability, improved chroma and brightness and gloss.

EXAMPLE 24

| | |
|---|---|
| Iron oxide red | 40 g |
| Dimerex Resin | 5.49 g |
| Sodium hydroxide | 0.73 g |
| Al₁₂ | 29.8 ml |

Into 1000 ml of water is dispersed 40 g of iron oxide red at 80° C. 5.49 g Of Dimerex Resin and 0.73 g of sodium hydroxide are separately dissolved at 80° C. in 100 ml of hot water to be added to the dispersion of iron oxide red. 29.3 ml Of Al₁₂ is added gradually to the mixture under stirring, and stirring is continued for 30 minutes. The precipitate is recovered by filtration, washed with water and dried, thus resulting in iron oxide red with exceedingly superior oil dispersability, highly improved chroma and brightness, gloss and freedom from bleeding.

Experimental Example 8

The coated test specimens are prepared with the iron oxide red pigments obtained in Examples 22, 23 and 24 as well as commercially available iron oxide red (referred to as "original color") to measure the reflectances at each of the indicated wavelengths by means of the self-recording spectrophotometer. The results confirm the distinct differences between the original color and the improvement-treated pigments. In other words, by calculating the tristimulus values, X, Y and Z, as measured by the self-recording spectrophotometer, in accordance with the equation of F.M.C.(II), the differences between the original color and the improvement-treated pigments are determined in terms of the color differences, $\Delta E$; the results are shown in Table 8.

TABLE 8

|  | Example 22 | Example 23 | Example 24 |
|---|---|---|---|
| $\Delta E$ | 9.533 | 8.485 | 12.645 |

EXAMPLE 25

| Cyanine blue | 20 g |
|---|---|
| Benzidine yellow | 10 g |
| Rosin | 3 g |
| Sodium hydroxide | 0.32 g |
| $Al_6$ | 1.49 ml |

20 g Of cyanine blue is well admixed with 10 g of benzidine yellow to prepare the mixture, while 3 g of rosin and 0.32 g of sodium hydroxide are dissolved at 90° C. in 100 ml of hot water and cooled down to 20° C. The mixture and solution thus prepared are simultaneously dispersed into 700 ml of water. 1.49 ml Of $Al_6$ is added gradually to the dispersion under stirring, and stirring is continued for 30 minutes. The precipitate is recovered by filtration, washed with water and dried, thus resulting in the pigment with the exceedingly superior oil dispersability, highly improved chroma and brightness, and freedome from bleeding.

EXAMPLE 26

| Brilliant carmine 6B | 30 g |
|---|---|
| Staybelite Resin | 5.03 g |
| Sodium hydroxide | 0.66 g |
| $Al_6$ | 3.18 ml |

30 g Of Brilliant carmine 6B is well soaked with 100 ml of 90% alcohol, and dispersed into 800 ml of water. 5.03 g Of Staybelite Resin and 0.66 g of sodium hydroxide are separately dissolved at 80° C. in 100 ml of hot water to be added to a dispersion of Brilliant carmine 6B. 3.18 ml Of $Al_6$ is added gradually to the mixture under stirring, and stirring is continued for 30 minutes. The precipitate is recovered by filtration, washed with water and dried, thus resulting in the Brilliant carmine 6B with the exceedingly superior oil dispersability, complete disappearance of bronze coloration, highly improved chroma and brightness, as well as freedom from bleeding.

EXAMPLE 27

| Brilliant carmine 6B | 30 g |
|---|---|
| Rondis R | 5.00 g |
| Sodium hydroxide | 0.68 g |
| $Al_6$ | 3.28 ml |

30 g Of Brilliant carmine 6B is well soaked with 100 ml of 90% alcohol, and further dispersed into 800 ml of water. 5.0 g Of Rondis R and 0.68 g of sodium hydroxide are separately dissolved at 80° C. into 100 ml of hot water to be added to the dispersion of Brilliant carmine 6B. 3.28 ml Of $Al_6$ is added gradually to the mixture under stirring, and stirring is continued for 30 minutes. The precipitate is recovered by filtration, washed with water and dried, thus resulting in the Brilliant carmine 6B with the exceedingly superior oil dispersability, complete disappearance of bronze, highly improved chroma and brightness and freedom from bleeding.

EXAMPLE 28

| Brilliant carmine 6B | 30 g |
|---|---|
| Rosin | 5.01 g |
| Sodium hydroxide | 0.66 g |
| $Al_6$ | 3.19 ml |

30 g Of Brilliant carmine 6B is well soaked with 100 ml of 90% alcohol, and further dispersed into 800 ml of water. 5.01 g Of rosin and 0.66 g of sodium hydroxide are separately dissolved at 80° C. in 100 ml of hot water to be added to the dispersion of Brilliant carmine 6B. 3.19 ml Of $Al_6$ is added gradually to the mixture under stirring, and stirring is continued for 30 minutes. The precipitate is recovered by filtration, washed with water and dried, resulting in the Brilliant carmine 6B with the exceedingly superior oil dispersability, complete disappearance of bronze, highly improved chroma and brightness, and freedom from bleeding.

Experimental Example 9

The coated test specimens are prepared with the Brilliant carmine 6B pigments obtained in Examples 26, 27 and 28 as well as commercially available Brilliant carmine 6B (referred to as "original color") to measure the reflectances at each of the indicated wavelengths by the self-recording spectrophotometer. The results confirm the distinct differences between the original color and the improvement-treated pigments. In other words, by calculating the tristimulus values, X, Y and Z, as measured by the self-recording spectrophotometer, in accordance with the equation of F.M.C.(II), the differences between the original color and the improvement-treated pigments are determined in terms of the color differences, $\Delta E$; the results are shown in Table 9.

TABLE 9

|  | Example 26 | Example 27 | Example 28 |
|---|---|---|---|
| $\Delta E$ | 13.090 | 13.554 | 10.506 |

EXAMPLE 29

| Titanium dioxide | 100 g |
|---|---|
| Staybelite Resin | 8.4 g |
| Sodium hydroxide | 1.2 g |
| $Al_{12}$ | 45 ml |

Into 2.0 l of water is dispersed 100 g of titanium dioxide. 8.4 g Of Staybelite Resin and 1.2 g of sodium hydroxide are separately dissolved at 80° C. in 100 ml of hot water to be added to the dispersion of titanium dioxide. 45 ml Of $Al_{12}$ is added gradually to the mixture under stirring, and stirring is continued for 30 minutes. The precipitate is recovered by filtration, washed with water and dried, resulting in titanium dioxide with exceedingly superior dispersability and freedom from bleeding.

EXAMPLE 30

| | |
|---|---|
| Permanent orange | 10 g |
| Titanium dioxide | 40 g |
| Rondis R | 8.34 g |
| Sodium hydroxide | 1.21 g |
| $Al_6$ | 5.4 ml |

10 g Of Permanent orange and 40 g of titanium dioxide are well soaked with 100 ml of 90% alcohol and, to the mixture is added a solution consisting of 8.34 g of Rondis R and 1.21 g of sodium hydroxide dissolved at 80° C. in 100 ml of hot water, followed by adding water to make the total to 1.5 l for adequate dispersion. 5.4 ml Of $Al_6$ is added gradually to the dispersion under stirring, and stirring is continued for 30 minutes. The precipitate is recovered by filtration, washed with water and dried, resulting in the pigment with exceedingly superior oil dispersability, highly improved chroma and brightness, as well as freedom from bleeding.

Industrial Applicability

The pigments improved by means of the method or improving agent according to the present invention can widely be applied to such fields as cosmetics, plastic paints, inks, toners, writing materials (e.g. crayon, oil colors, etc.) and the like.

We claim:

1. An agent for improving the chroma and brightness of pigments, which consists of the product of reaction of a basic polyaluminum or aluminum salt with a resin acid or its salt, said resin acid being derived from a rosin or a modified rosin.

2. An agent for improving the chroma and brightness of pigments as described in claim 1, wherein the resin acid is derived from hydrogenated rosin.

3. An agent for improving the chroma and brightness of pigments as described in claim 1, wherein the resin acid is derived from polymerized rosin.

4. An agent for improving the chroma and brightness of pigments as described in claim 1, wherein the resin acid is derived from disproportionated rosin.

* * * * *